(12) United States Patent
Loyola Heufemann et al.

(10) Patent No.: US 11,436,771 B2
(45) Date of Patent: Sep. 6, 2022

(54) GRAPH-BASED COLOR DESCRIPTION GENERATION

(71) Applicant: INTERNATIONAL BUSINESS MACHINES CORPORATION, Armonk, NY (US)

(72) Inventors: Pablo Salvador Loyola Heufemann, Tokyo (JP); Jayakorn Vongkulbhisal, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 17/100,018

(22) Filed: Nov. 20, 2020

(65) Prior Publication Data

US 2022/0165006 A1    May 26, 2022

(51) Int. Cl.
| | |
|---|---|
| *G06T 11/20* | (2006.01) |
| *G06T 7/00* | (2017.01) |
| *G06T 7/90* | (2017.01) |
| *G06F 16/901* | (2019.01) |
| *G06N 3/04* | (2006.01) |

(Continued)

(52) U.S. Cl.
CPC ........ *G06T 11/206* (2013.01); *G06F 16/5838* (2019.01); *G06F 16/9024* (2019.01); *G06N 3/0445* (2013.01); *G06N 3/088* (2013.01); *G06T 7/90* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 8,594,420 B2 | 11/2013 | Mojsilovic |
| 8,891,860 B2 | 11/2014 | Masuko |

(Continued)

FOREIGN PATENT DOCUMENTS

| | | |
|---|---|---|
| CN | 101556652 B | 10/2009 |
| TW | 202022649 A | 6/2020 |

OTHER PUBLICATIONS

International Search Report issued in PCT Application No. PCT/IB2021/060583, dated Mar. 2, 2022, pp. 1-9.

(Continued)

*Primary Examiner* — Tapas Mazumder
(74) *Attorney, Agent, or Firm* — Tutunjian & Bitetto, P.C.; Randall Bluestone

(57) ABSTRACT

A method, system and computer program product are presented for generating a description in natural language for a color. The method includes acquiring a list of tuples, generating a graph by using each of the tuples as a node and adding edges between the nodes when a difference between colors of the nodes in terms of human perception is outside a predetermined range, filtering the edges based on external color comparative descriptions, incorporating a new node in the graph by finding a closest neighbor node based on the color difference and adding a new edge between the new node and the closest neighbor node, learning a feature vector for each of the nodes by using message passing and the colors of the nodes as initial seeds, and generating a description of the new node by using each of the learned feature vectors as initial states for a neural-network based decoder.

25 Claims, 12 Drawing Sheets

(51) Int. Cl.
  *G06N 3/08*  (2006.01)
  *G06F 16/583*  (2019.01)

(56) References Cited

U.S. PATENT DOCUMENTS

| | | | |
|---|---|---|---|
| 2004/0114162 A1* | 6/2004 | McElvain | H04N 1/58 |
| | | | 358/1.9 |
| 2006/0087517 A1 | 4/2006 | Mojsilovic | |
| 2012/0195499 A1 | 8/2012 | Hosomi | |
| 2013/0282765 A1 | 10/2013 | Bhattacharjee et al. | |
| 2017/0287171 A1* | 10/2017 | Grams | G06V 30/333 |
| 2020/0176113 A1 | 6/2020 | Megerian et al. | |
| 2020/0250249 A1* | 8/2020 | Fedoryszak | H04L 51/52 |

OTHER PUBLICATIONS

Monroe et al., "Learning to Generate Compositional Color Descriptions", arXiv preprint. arXiv:1606.03821. Jun. 13, 2016. pp. 1-6.

Winn et al., "'Lighter' Can Still Be Dark: Modeling Comparative Color Descriptions", Proceedings of the 56th Annual Meeting of the Association for Computational Linguistics (vol. 2: Short Papers). Jul. 2018. pp. 790-795.

Yao et al., "Exploring Visual Relationship for Image Captioning", Proceedings of the European Conference on Computer Vision (ECCV 2018.) Sep. 8-14, 2018. pp. 684-699.

Zhang et al., "Bertscore: Evaluating Text Generation With Bert", Published as a conference paper at ICLR 2020. arXiv:1904.09675v3 [cs.CL]. Feb. 24, 2020. pp. 1-43.

Mell et al., "The NIST Definition of Cloud Computing", National Institute of Standards and Technology, Special Publication 800-145. Sep. 2011, pp. 1-7.

\* cited by examiner

GRAPH-BASED COLOR DESCRIPTION GENERATION

BACKGROUND

The present invention relates generally to color naming, and more specifically, to generating graph-based color descriptions.

Color is one of the main visual cues and has been studied extensively on many different levels, starting from the physics and psychophysics of color, to the use of color principles in practical problems. These include accurate rendering, display and reproduction, image filtering, coding, retrieval, and numerous other applications in scientific visualization, computer graphics, image and video processing. Interestingly, although color naming represents one of the most common visual tasks, it has not received significant attention in the engineering community. Yet today, with rapidly emerging visual technologies and multimedia, and the development of sophisticated user interfaces and human-machine interactions, the ability to name individual colors, point to objects of a certain color, and convey the impression of color composition becomes an increasingly important task. Color cues can be used in interactive visualization and computer graphics. Color naming facilitates natural user interface design. The extraction of higher-level color descriptors represents a challenging problem in image analysis and computer vision, as these descriptors often provide links to image content. When combined with image segmentation, it would be advantageous to be able to use color naming to select objects by color, describe the appearance of the image and even generate semantic annotations.

SUMMARY

In accordance with an embodiment, a method is provided for generating a description in natural language for a color. The method includes acquiring a list of tuples, each of the tuples including a color and a description, generating a graph by using each of the tuples as a node and adding edges between the nodes when a difference between colors of the nodes in terms of human perception is outside a predetermined range, filtering the edges based on external color comparative descriptions stored in an external color comparative database, incorporating a new node in the graph by finding a closest neighbor node based on the color difference in terms of human perception and adding a new edge between the new node and the closest neighbor node, the new node including a new color which is not included in the list of tuples and has no description, learning a feature vector for each of the nodes in the graph by using message passing and the colors of the nodes as initial seeds, and generating a description of the new node by using each of the learned feature vectors as initial states for a recurrent neural network (RNN)-based decoder in a semi-supervised fashion.

In accordance with another embodiment, a method is provided for generating a description in natural language for a color. The method includes obtaining a list of tuples, each of the tuples including a color and a description, generating a graph by using each of the tuples as a node and adding edges between the nodes based on a similarity threshold, filtering the edges based on external color comparative descriptions stored in an external color comparative database, and incorporating a new node in the graph by finding a closest neighbor node based on the similarity threshold and adding a new edge between the new node and the closest neighbor node.

A computer program product for generating a description in natural language for a color is presented, the computer program product comprising a computer readable storage medium having program instructions embodied therewith, the program instructions executable by a computer to cause the computer to acquire a list of tuples, each of the tuples including a color and a description, generate a graph by using each of the tuples as a node and add edges between the nodes when a difference between colors of the nodes in terms of human perception is outside a predetermined range, filter the edges based on external color comparative descriptions stored in an external color comparative database, incorporate a new node in the graph by finding a closest neighbor node based on the color difference in terms of human perception and add a new edge between the new node and the closest neighbor node, the new node including a new color which is not included in the list of tuples and has no description, learn a feature vector for each of the nodes in the graph by using message passing and the colors of the nodes as initial seeds, and generate a description of the new node by using each of the learned feature vectors as initial states for a recurrent neural network (RNN)-based decoder in a semi-supervised fashion.

A computer program product for generating a description in natural language for a color is presented, the computer program product comprising a computer readable storage medium having program instructions embodied therewith, the program instructions executable by a computer to cause the computer to obtain a list of tuples, each of the tuples including a color and a description, generate a graph by using each of the tuples as a node and add edges between the nodes based on a similarity threshold, filter the edges based on external color comparative descriptions stored in an external color comparative database, and incorporate a new node in the graph by finding a closest neighbor node based on the similarity threshold and add a new edge between the new node and the closest neighbor node.

In accordance with yet another embodiment, a method is provided for generating a description in natural language for a color. The method includes generating a graph to structure color relationships, the graph including a plurality of nodes and edges, removing redundant edges based on color comparative descriptions, incorporating new nodes with new edges in the graph based on a similarity threshold, learning a feature vector for each of the nodes of the graph, and generating a description of the new nodes by employing the feature vectors, the feature vectors fed into a neural network in a semi-supervised manner.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
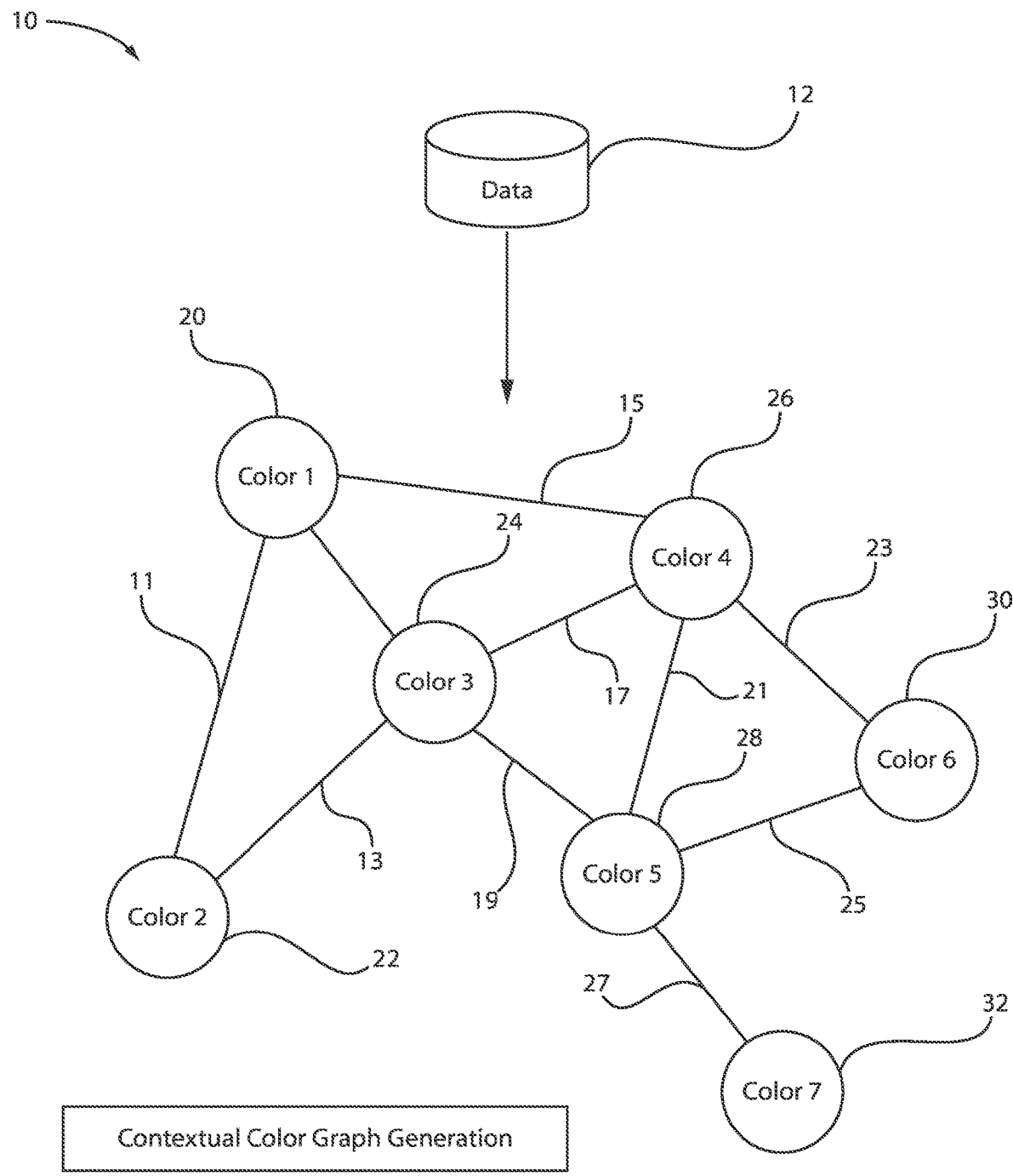
FIG. 1 is an exemplary diagram illustrating contextual color graph generation, in accordance with an embodiment of the present invention.

Exemplary embodiments in accordance with the present invention provide for generating a description in natural language for a color. Color grounding tasks allow for characterizing the relationship between language and color perception. Learning a mapping between language and color is important for understanding several aspects of the emergence of human expression. Applications of color grounding are related to, e.g., advertisement and/or marketing for predicting public opinion (unstructured, abstract) and using such public opinion to support branding, infer user response, etc. A task in color grounding is to learn to generate a description in natural language for a color. The exemplary embodiments of the present invention structure a training set as a graph and perform description generation in a semi-supervised fashion.

Although color spaces allow for color specification in unambiguous manner, in everyday life colors are mainly identified by their names. Although this requires a fairly general color vocabulary and is far from being precise, identifying a color by its name is a method of communication that everyone understands. Hence, there were several attempts towards designing a vocabulary, syntax and standard method for choosing color names. The Munsell color order system known to those skilled in the art, is widely used in applications requiring precise specification of colors. Examples include production of paints, textiles, etc. It is often used as an industry standard, complemented by Munsell's Book of Color which includes 1,200 precisely controlled samples of colors (chips). The chips are arranged such that unit steps between them are intended to be perceptually equal. Each chip is identified by a 3-part code. The brightness scale is represented by the Munsell value with black denoted by 0/and white by 10/. Munsell chroma increases in steps of two (/2, /4, . . . , /10). The hue scale is divided into 10 hues: red (R), yellow-red (YR), yellow (Y), green-yellow (GY), green (G), blue-green (BG), blue (B), purple-blue (PB), purple (P), red-purple (RP), each hue can be further divided into ten sections. However, one notable disadvantage of the Munsell system for color-based processing is the lack of the exact transform from any color spaces to Munsell. For example, a transform proposed by others is fairly complicated and sometimes inaccurate for certain regions of CIE XYZ.

The first listing of over 3000 English words and phrases used to name colors was devised by Maerz and Paul and published in a Dictionary of colors. Even more detailed was a dictionary published by The National Bureau of Standards. It included about 7500 different names that came to general use in specific fields such as biology, geology, philately, textile, dyes and paint industry. Both dictionaries include examples of rare or esoteric words, and the terms are listed in an unsystematic manner, making them unsuitable for general use.

The National Bureau of Standards developed the ISCC-NBS dictionary of color names for 267 regions in color space. This dictionary employs English terms to describe colors along the three dimensions of the color space: hue, brightness and saturation. One problem with the ISCC-NBS model is the lack of systematic syntax. This was addressed during the design of a new Color-Naming System (CNS). The CNS was based in part on the ISCC-NBS model. It uses the same three dimensions, however the rules used to combine words from these dimensions are defined in a formal syntax. An extension of the CNS model, called the Color-Naming Method (CNM), uses a systematic syntax similar to the one described in the CNS model, and maps the color names from the CNM into color ranges in the Munsell system. All the aforementioned methods are closely related to the Munsell model and thus provide explanation on how to locate each name within the Munsell color space.

However, it is not obvious how to use these methods to attach a color name to a color sample, point out examples of named colors, describe the color region and objects in a scene, and ultimately communicate the color composition of an image.

The exemplary embodiments of the present invention disclose methods and systems that alleviate such issues by generating a graph-based color description mechanism or structure. The training set is structured as a graph and performs description generation in a semi-supervised manner. The exemplary embodiments of the present invention use contextual information that incorporates global perception of color representations. Use of human perception allows for more realistic color relationships, graph-based representations allow neighboring nodes to share information/context, and contextual information provides useful diversity when an exact match is not met potentially leading to the discovery of more color-language associations. Additionally, fewer memorization issues are presented compared to standard models in view of the exemplary embodiments of the present invention.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this invention.

FIG. 1 is an exemplary diagram illustrating contextual color graph generation, in accordance with an embodiment of the present invention.

For the contextual color graph generation 10, data 12 is structured as a graph based on a similarity threshold t. Threshold t is defined based on Delta E, which is a metric that accounts for how humans perceive color differences (useful metric as distances in RGB space are not perceived linearly). Specifically, if a Delta E value between two colors is between 11 and 49 the exemplary methods generate a link. If the Delta E value is outside that range (too similar, almost identical, or too far) the exemplary methods don't add an edge.

The contextual color graph can include, in one non-limiting example, a first color 20, a second color 22, a third color 24, a fourth color 26, a fifth color 28, a sixth color 30, and a seventh color 32. The first color 20 is connected to the second color 22 via edge 11. The second color 22 is connected to the third color 24 via edge 13. The third color 24 is connected to the fourth color 26 via edge 17. The first color 20 is connected to the fourth color 26 via edge 15. The third color 24 is connected to the fifth color 28 via edge 19. The fourth color 26 is connected to the fifth color 28 via edge 21. The fourth color 26 is connected to the sixth color 30 via edge 23. The fifth color 28 is connected to the sixth color 30 via edge 25. The fifth color 28 is connected to the seventh color 32 via edge 27.

The data 12 can be designated as a list T of (color, description) tuples $(c_i, d_i)$ where $c_i$: color expressed as RGB tuple, $d_i$: sequence of tokens.

The graph, G, can be given as:

---

Graph G
Threshold t=[ts, te]
Given $(c_i, d_i), (c_j, d_j)$ for all i, j in T:
  if ts< diff($c_i, c_j$) < te:
    G.add_edge(($c_i, d_i$)($c_j, d_j$))

---

Delta E (or dE) is a single number that represents the "distance" between two colors. The idea is that a dE of 1.0 is the smallest color difference the human eye can see. So any dE less than 1.0 is imperceptible and it stands to reason that any dE greater than 1.0 is noticeable. However, some color differences greater than 1 are perfectly acceptable, maybe even unnoticeable. Also, the same dE color difference between two yellows and two blues may not look like the same difference to the eye and there are other places where it can look different to the eye of the observer.

Delta E levels are the difference between the displayed color and the original color standard of the input content. Lower Delta E figures indicate greater accuracy, while high Delta E levels indicate a significant mismatch. The "E" in Delta E stands for "Empfindung," which is the German word for sensation. As a whole, the term Delta E means a difference in sensation. The exemplary embodiments create or generate a graph-based method for assisting in defining new colors.

Figure 2:
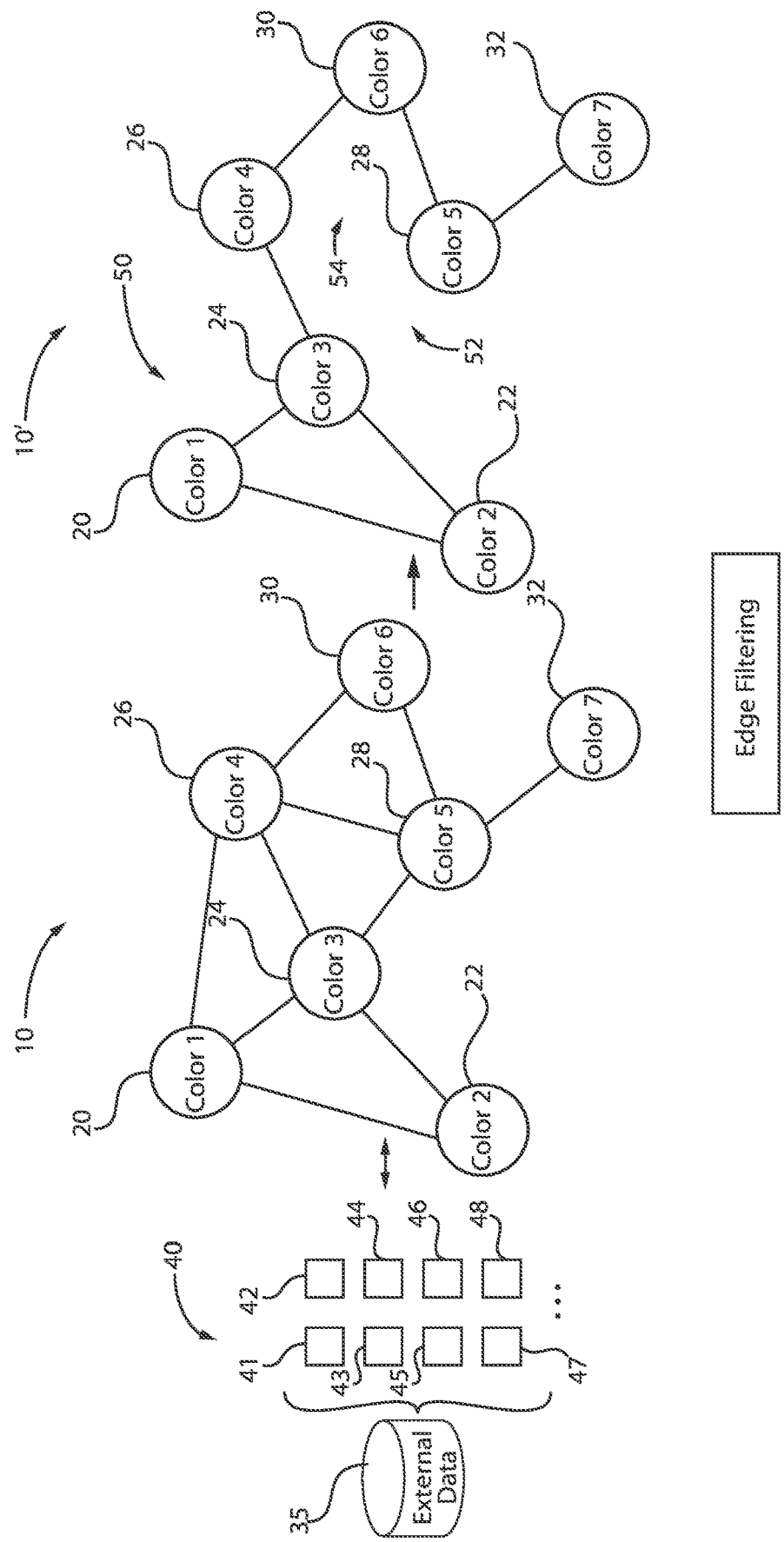
FIG. 2 is an exemplary diagram illustrating edge filtering, in accordance with an embodiment of the present invention.

FIG. 2 is an exemplary diagram illustrating edge filtering, in accordance with an embodiment of the present invention.

For the edge filtering, external data of an external data color comparative database 35 is used to remove redundant or unfeasible edges. Color comparative data 40 is used. The color comparative data can include, in one non-limiting example, several different colors 41-48. For each edge, if a (source, target) pair is close to any pair in the dataset, the edge is kept or maintained. If not, the edge is removed. This allows for the obtainment of smoother transitions (e.g., to avoid abrupt color changes) which eventually facilitates learning. The removal of the edges results in contextual color graph 10'. In such graph 10', three edges have been removed. The first edge removed is designated as 50 and was located between the first color 20 and the fourth color 26. The second edge removed is designated as 52 and was located between the third color 24 and the fifth color 28. The third edge removed is designated as 54 and was located between the fourth color 26 and the fifth color 28. Thus, based on the external data, it was determined that such 3 edges were either redundant or unfeasible edges. It is noted that the external data is stored in an external data color comparative database 35, which is a custom database for storing only comparative color data.

Figure 3:
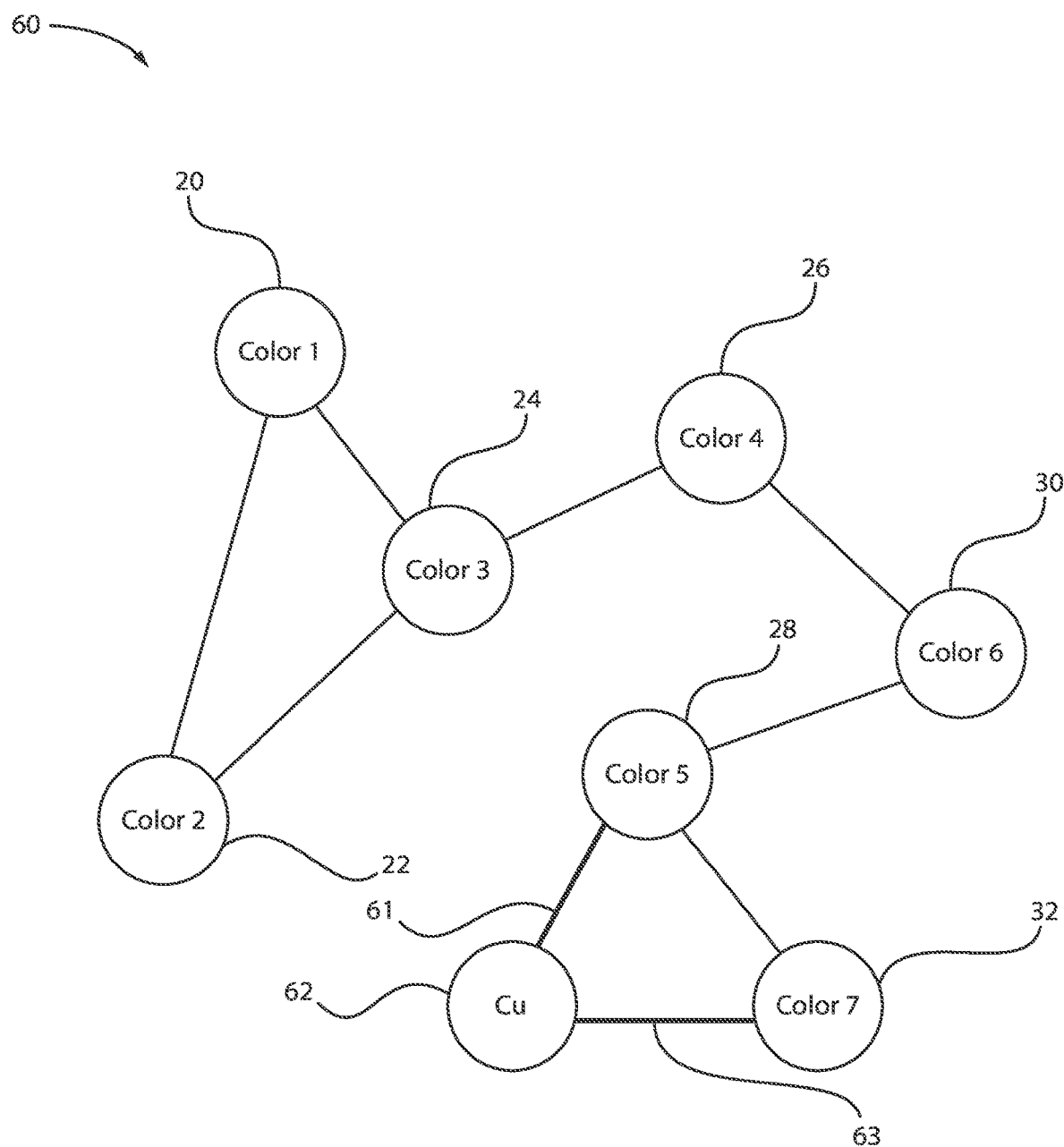
FIG. 3 is an exemplary diagram illustrating unlabeled node addition, in accordance with an embodiment of the present invention.

FIG. 3 is an exemplary diagram illustrating unlabeled node addition, in accordance with an embodiment of the present invention.

For the unlabeled node addition, given an unseen color, it is represented as an unlabeled node (does not have description, only color). The unseen color 62 is incorporated in the main graph 60 by finding the closest neighborhood in terms of color differences. Again, for this process, the human perception metric Delta E is used as a threshold (same configuration as described above with regards to the contextual color graph generation of FIG. 1). After the node 62 is added to the graph 60, the goal is to use the contextual information that the edges provide from the set of labeled nodes to the unlabeled nodes and with that learn a description $d_u$ for node $c_u$. The new node 62 has edges 61 and 63. Edge 61 connects or links the new node 62 to the fifth color 28 and edge 63 connects or links the new node 62 to the seventh node 32. Thus, the color of node 62 is similar or close to the colors 28, 32.

Figure 4:
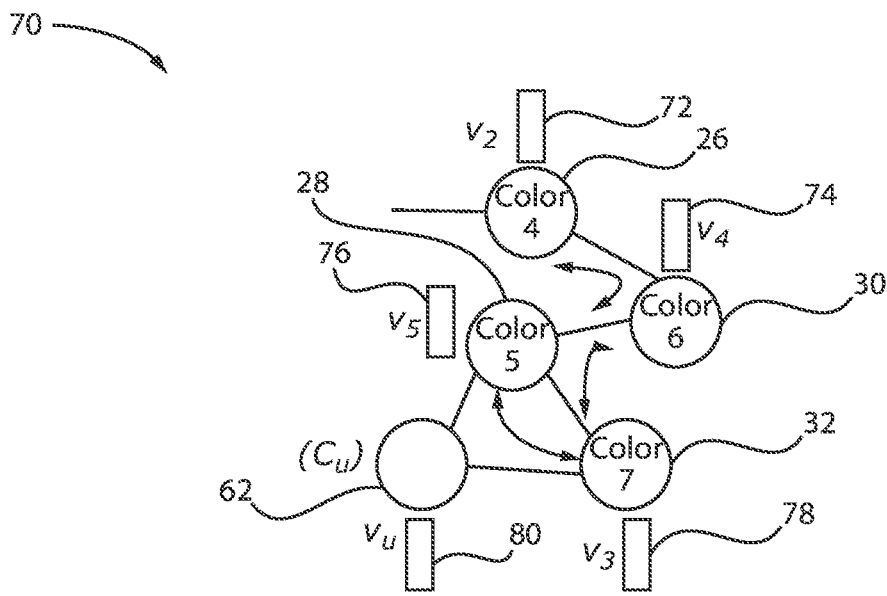
FIG. 4 is an exemplary diagram illustrating color-based node feature learning, in accordance with an embodiment of the present invention.

FIG. 4 is an exemplary diagram 70 illustrating color-based node feature learning, in accordance with an embodiment of the present invention.

For the color-based node feature learning, the color is used as an initial seed and a message passing algorithm is used to learn a feature vector for all nodes. With this, each resulting vector encodes the relationship between each color and its surrounding neighbors.

In particular, 5 colors are shown. Thus, 5 vectors are generated. For example, the fourth color 26 has feature vector 72, the fifth color 28 has feature vector 76, the sixth color 30 has feature vector 74, the seventh color 32 has feature vector 78, and the new node 62 has feature vector 80. The arrows between colors 28, 32 and colors 30, 32, and colors 26, 30 indicate the relationships developed between different colors.

It is noted that the message passing algorithm (MPA) is a kind of probability propagation algorithm that operates in a graphical model of the code. The MPA is also known as an iterative algorithm as messages pass back and forth between the variable node and check node iteratively until a result is achieved or the process is halted.

Figure 5:
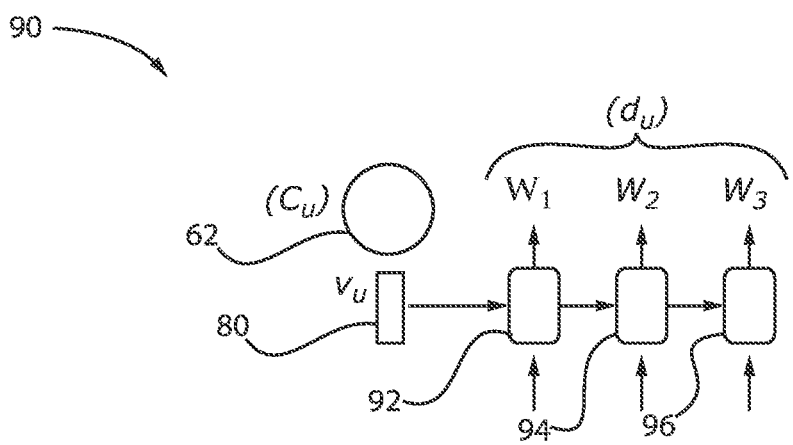
FIG. 5 is an exemplary diagram illustrating description generation, in accordance with an embodiment of the present invention.

FIG. 5 is an exemplary diagram 90 illustrating description generation, in accordance with an embodiment of the present invention.

For the description generation, the learned vectors are used in a semi-supervised setting. Each vector is passed to a recurrent neural network (RNN)-based decoder 92, 94, 96 and serves as its initial seed for generation. Loss in the RNN is computed on the labeled part of the graph. Therefore, learning affects all representations involved (both labeled and unlabeled). Moreover, the feature vector 80 of new node 62 is passed through decoders 92, 94, 96 to generate the weights $w_1$, $w_2$, $w_3$.

Figure 6:
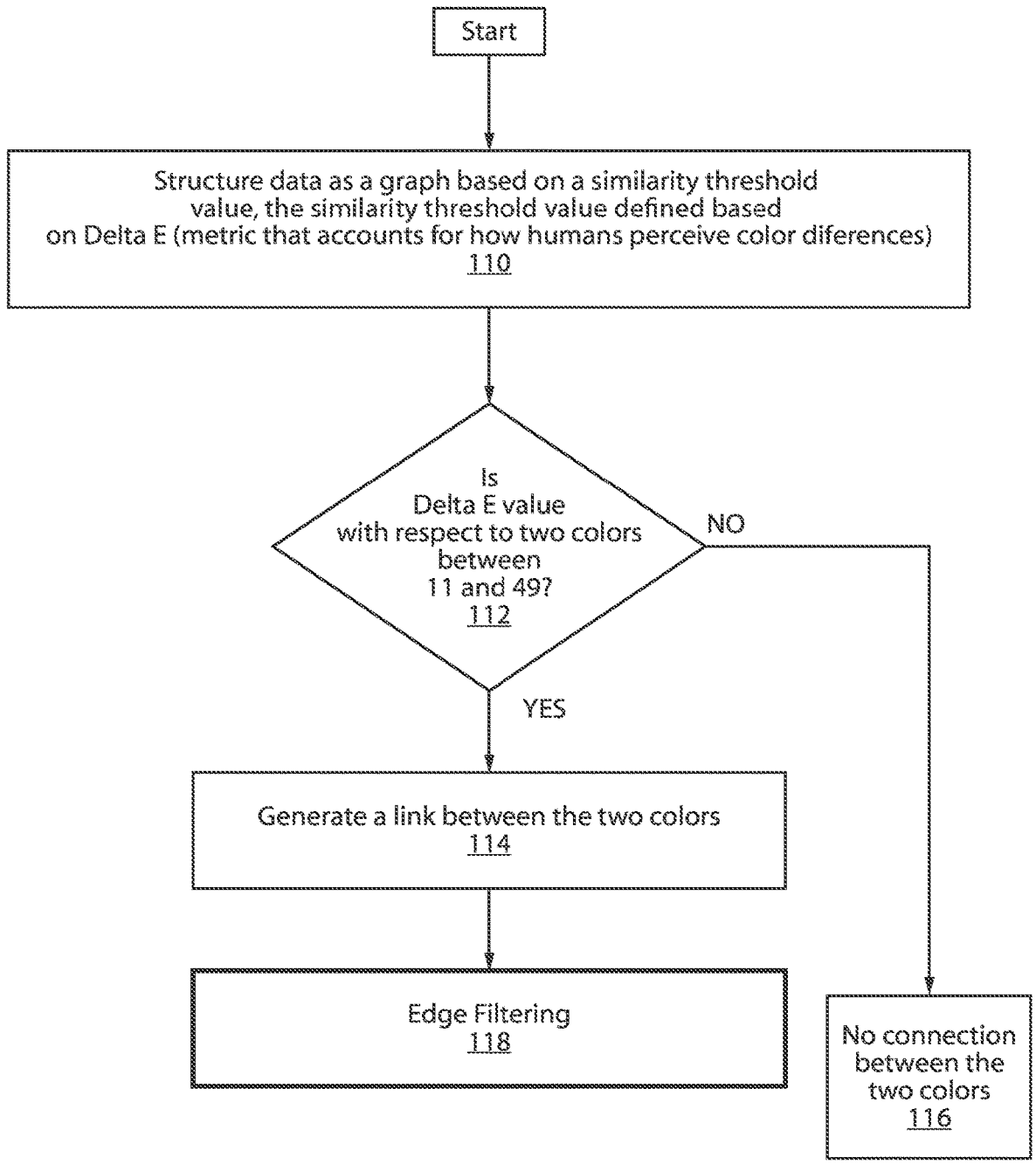
FIG. 6 is a block/flow diagram of an exemplary method for contextual color graph generation, in accordance with an embodiment of the present invention.

FIG. 6 is a block/flow diagram of an exemplary method for contextual color graph generation, in accordance with an embodiment of the present invention.

At block 110, data is structured as a graph based on a similarity threshold value, the similarity threshold value defined based on Delta E (metric that accounts for how humans perceive color differences).

At block 112, it is determined whether a Delta E value with respect to two colors is between 11 and 49? If YES, the process proceeds to block 114. If NO, the process proceeds to block 116.

At block 114, a link is generated between the two colors.

At block 118, after contextual color graph generation is performed, edge filtering is commenced.

At block 116, if the Delta E value is not between 11 and 49, no connection is defined between the two colors.

Figure 7:
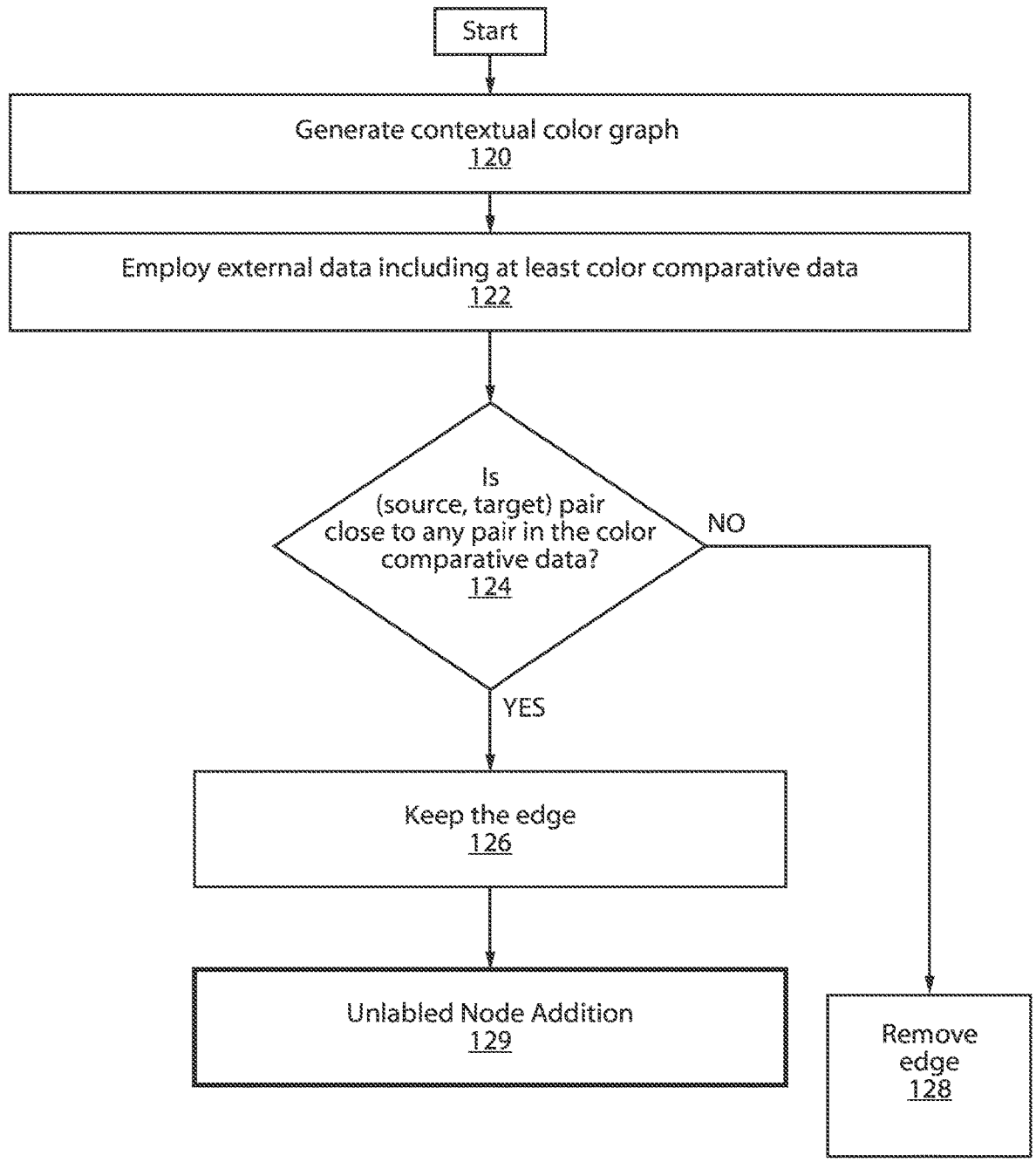
FIG. 7 is a block/flow diagram of an exemplary method for edge filtering, in accordance with an embodiment of the present invention.

FIG. 7 is a block/flow diagram of an exemplary method for edge filtering, in accordance with an embodiment of the present invention.

At block 120, the contextual color graph is generated, as described with reference to FIG. 6.

At block 122, external data is employed including at least color comparative data to commence the edge filtering process.

At block 124, it is determined whether a (source, target) pair is close to any pair in the color comparative data. If YES, the process proceeds to block 126. If NO, the process proceeds to block 128.

At block 126, the edge is maintained or kept.

At block 129, after edge filtering is performed, unlabeled node addition takes place.

At block 128, if the pair is not close to any pair in the color comparative data, then the edge is removed.

Figure 8:
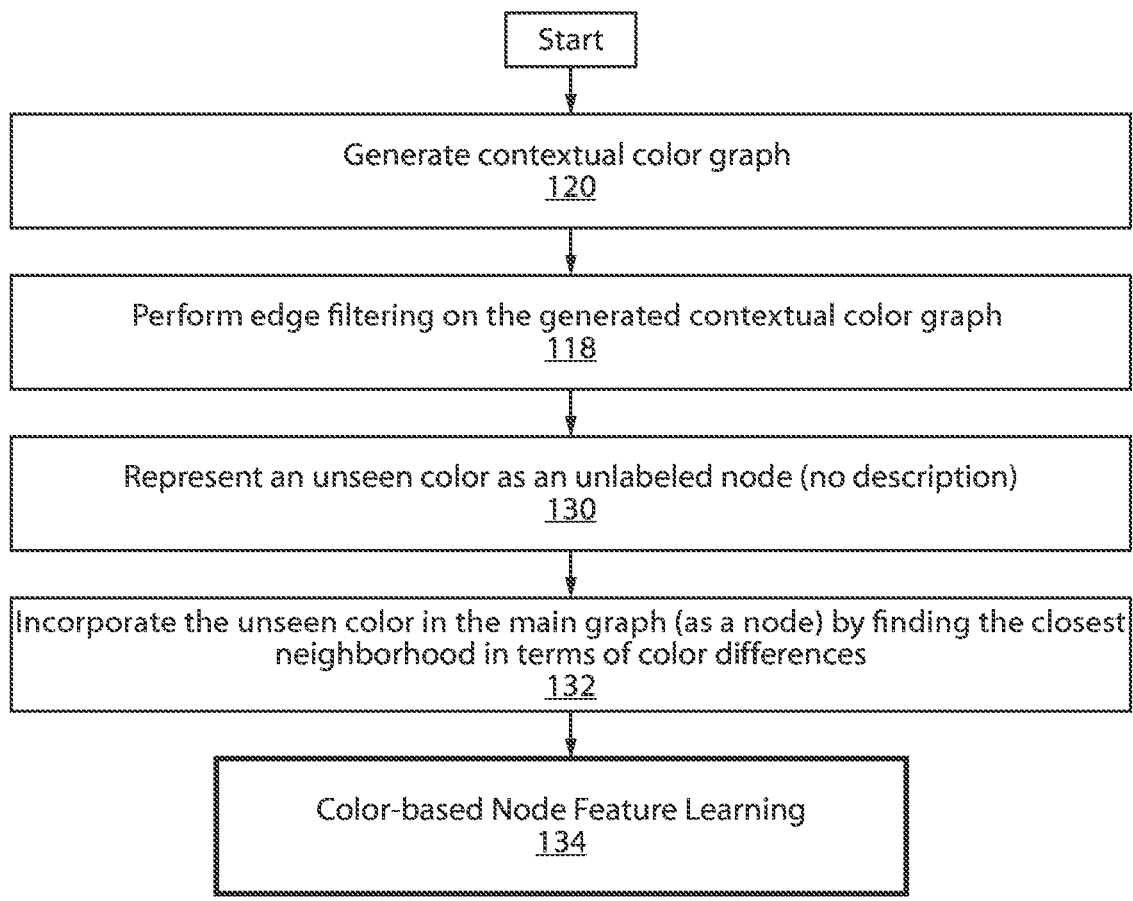
FIG. 8 is a block/flow diagram of an exemplary method for unlabeled node addition, in accordance with an embodiment of the present invention.

FIG. 8 is a block/flow diagram of an exemplary method for unlabeled node addition, in accordance with an embodiment of the present invention.

At block 120, the contextual color graph is generated, as described with reference to FIG. 6.

At block 118, the edge filtering is performed, as described with reference to FIG. 7.

At block 130, an unseen color is represented as an unlabeled node (no description).

At block 132, the unseen color is incorporated in the main graph (as a node) by finding the closest neighborhood in terms of color differences.

At block 134, after performing the unlabeled node addition, color-based node feature learning is performed.

Figure 9:
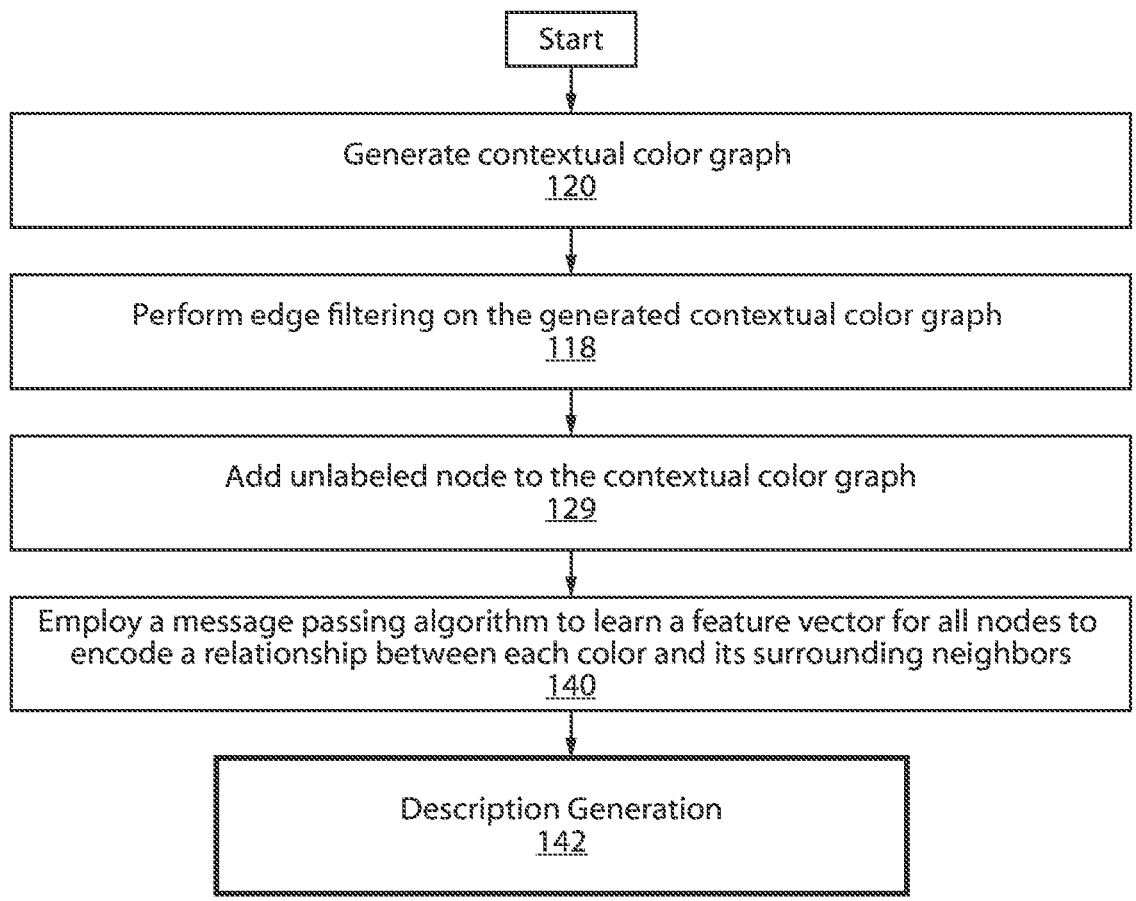
FIG. 9 is a block/flow diagram of an exemplary method for color-based node feature learning, in accordance with an embodiment of the present invention.

FIG. 9 is a block/flow diagram of an exemplary method for color-based node feature learning, in accordance with an embodiment of the present invention.

At block 120, the contextual color graph is generated, as described with reference to FIG. 6.

At block 118, the edge filtering is performed, as described with reference to FIG. 7.

At block 129, the unlabeled node addition to the contextual color graph is performed, as described with reference to FIG. 8.

At block 140, a message passing algorithm is employed to learn a feature vector for all nodes to encode a relationship between each color and its surrounding neighbors.

At block 142, after performing color-based node feature learning, description generation takes place.

Figure 10:
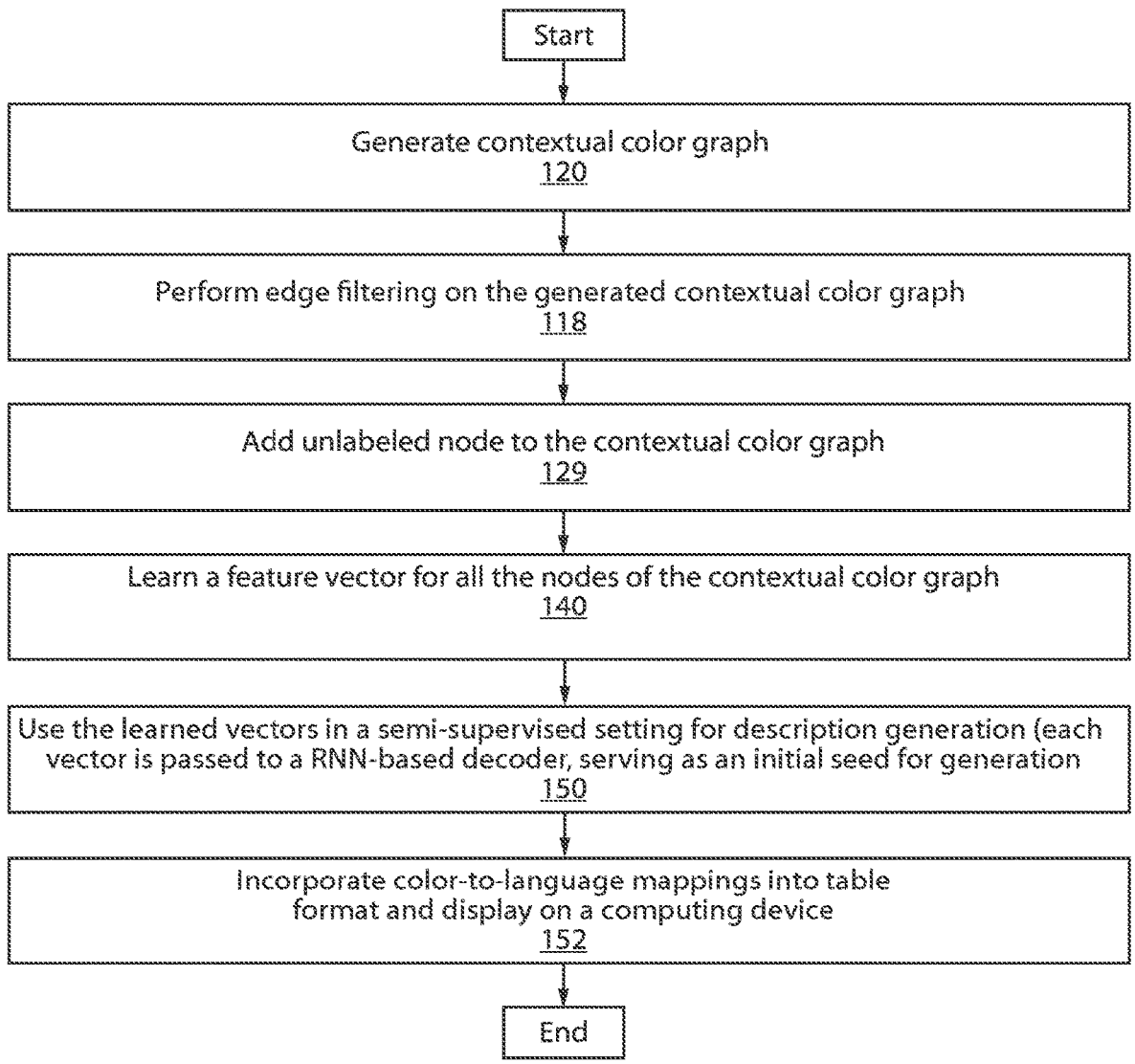
FIG. 10 is a block/flow diagram of an exemplary method for description generation, in accordance with an embodiment of the present invention.

FIG. 10 is a block/flow diagram of an exemplary method for description generation, in accordance with an embodiment of the present invention.

At block 120, the contextual color graph is generated, as described with reference to FIG. 6.

At block 118, the edge filtering is performed, as described with reference to FIG. 7.

At block 129, the unlabeled node addition to the contextual color graph is performed, as described with reference to FIG. 8.

At block 140, the feature vector is learned for all the nodes of the contextual color graph, as described with reference to FIG. 9.

At block 150, the learned vectors are used in a semi-supervised setting for description generation (each vector is passed to a RNN-based decoder, serving as an initial seed for generation).

At block 152, the color-to-language mappings are incorporated into a table format and displayed on a computing device.

Figure 11:
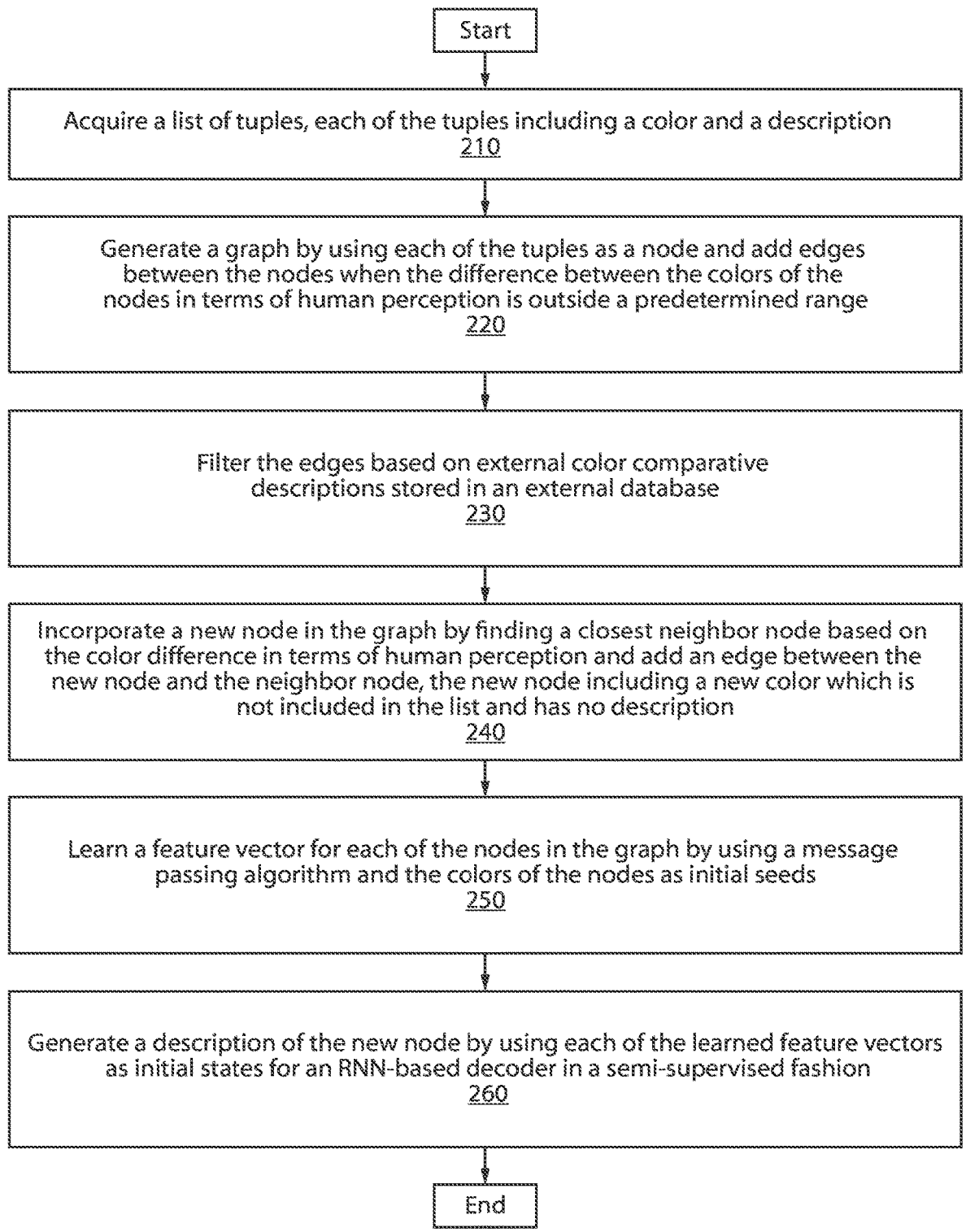
FIG. 11 is a block/flow diagram of an exemplary method for structuring a training set as a graph to perform description generation in a semi-supervised fashion, in accordance with an embodiment of the present invention.

FIG. 11 is a block/flow diagram of an exemplary method for structuring a training set as a graph to perform description generation in a semi-supervised fashion, in accordance with an embodiment of the present invention.

At block 210, acquire a list of tuples, each of the tuples including a color and a description.

At block 220, generate a graph by using each of the tuples as a node and add edges between the nodes when the difference between the colors of the nodes in terms of human perception is outside a predetermined range.

At block 230, filter the edges based on external color comparative descriptions stored in an external database.

At block 240, incorporate a new node in the graph by finding a closest neighbor node based on the color difference in terms of human perception and add an edge between the new node and the neighbor node, the new node including a new color which is not included in the list and has no description.

At block 250, learn a feature vector for each of the nodes in the graph by using a message passing algorithm and the colors of the nodes as initial seeds.

At block 260, generate a description of the new node by using each of the learned feature vectors as initial states for an RNN-based decoder in a semi-supervised fashion.

In summary, the exemplary embodiments of the present invention use contextual information that incorporates global perception of color representations. Use of human perception allows for more realistic color relationships, graph-based representations allow neighboring nodes to share information/context, and contextual information provides useful diversity when an exact match is not met potentially leading to the discovery of more color-language associations. Additionally, fewer memorization issues are presented compared to standard models. Also, only one graph per dataset is generated for the color-to-language mapping. Thus, a model is learned and a graph is used to structure color relationships, and syntactically valid descriptions are generated that can be used for several generation and retrieval tasks.

Figure 12:
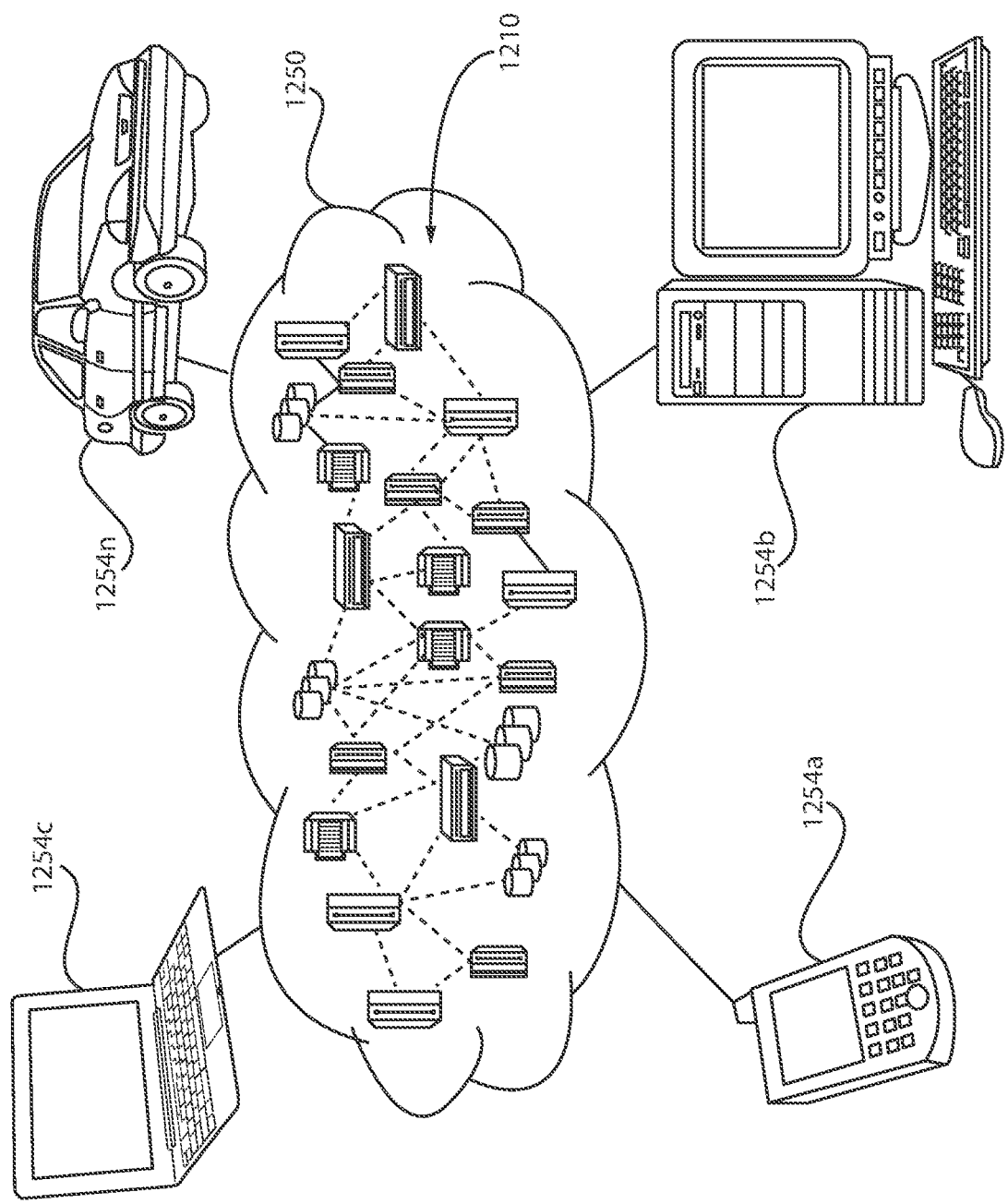
FIG. 12 is a block/flow diagram of an exemplary cloud computing environment, in accordance with an embodiment of the present invention.

FIG. 12 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 12, illustrative cloud computing environment 1250 is depicted for enabling use cases of the present invention. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N can communicate. Nodes 1210 can communicate with one another. They can be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
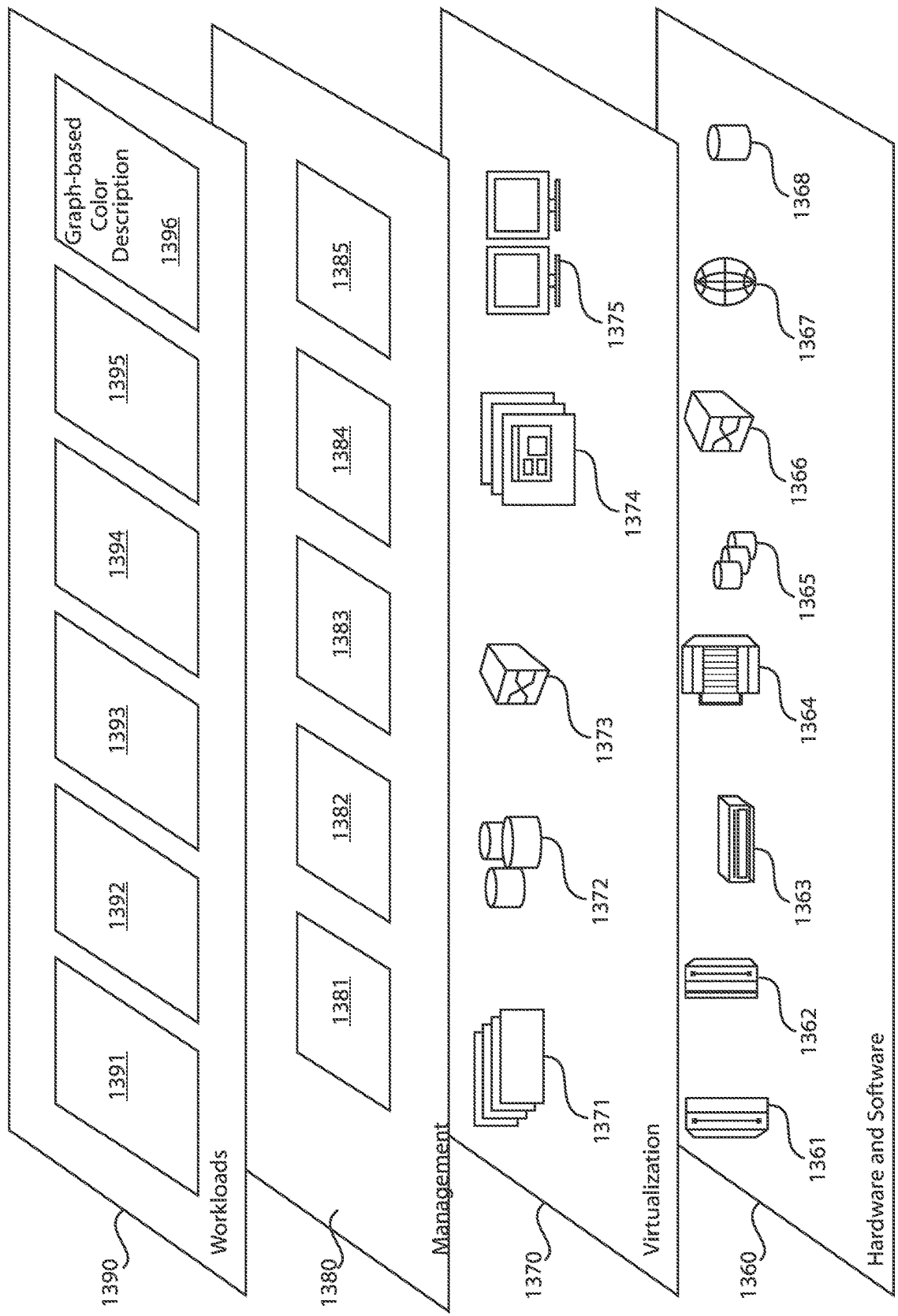
FIG. 13 is a schematic diagram of exemplary abstraction model layers, in accordance with an embodiment of the present invention.

FIG. 13 is a schematic diagram of exemplary abstraction model layers, in accordance with an embodiment of the present invention. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities can be provided: virtual servers 1371; virtual storage 1372; virtual networks 1373, including virtual private networks; virtual applications and operating systems 1374; and virtual clients 1375.

In one example, management layer 1380 can provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment can be utilized. Examples of workloads and functions which can be provided from this layer include: mapping and navigation 1391; software development and lifecycle management 1392; virtual classroom education delivery 1393; data analytics processing 1394; transaction processing 1395; and a graph-based color description 1396 in cloud servers.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of systems and methods for generating a description in natural language for a color (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for generating a description in natural language for a color, the computer-implemented method comprising:
   acquiring a list of tuples, each of the tuples including a color and a description;
   generating a graph by using each of the tuples as a node and adding edges between the nodes when a difference between colors of the nodes in terms of human perception is outside a predetermined range;
   filtering the edges based on external color comparative descriptions stored in an external color comparative database;
   incorporating a new node in the graph by finding a closest neighbor node based on the color difference in terms of human perception and adding a new edge between the new node and the closest neighbor node, the new node including a new color which is not included in the list of tuples and has no description;

learning a feature vector for each of the nodes in the graph by using message passing and the colors of the nodes as initial seeds; and generating a description of the new node by using each of the learned feature vectors as initial states for a recurrent neural network (RNN)-based decoder in a semi-supervised fashion.

2. The computer-implemented method of claim 1, wherein filtering the edges involves removing redundant or unfeasible edges from the graph.

3. The computer-implemented method of claim 1, wherein the color difference in terms of human perception is provided by metric Delta E.

4. The computer-implemented method of claim 3, wherein, if the Delta E between two colors is between 11 and 49, an edge is generated between the two colors.

5. The computer-implemented method of claim 1, wherein, after the new node is added to the graph, contextual information from the edges is used from a set of labeled nodes to a set of unlabeled nodes to learn a description for the new node.

6. The computer-implemented method of claim 1, wherein loss in the RNN is computed on a labeled portion of the graph.

7. The computer-implemented method of claim 1, wherein the new node is defined as an unlabeled node.

8. A computer-implemented method for generating a description in natural language for a color, the computer-implemented method comprising:

obtaining a list of tuples, each of the tuples including a color and a description;

generating a graph by using each of the tuples as a node and adding edges between the nodes based on a similarity threshold;

filtering the edges based on external color comparative descriptions stored in an external color comparative database; and incorporating a new node in the graph by finding a closest neighbor node based on the similarity threshold and adding a new edge between the new node and the closest neighbor node.

9. The computer-implemented method of claim 8, wherein the new node includes a new color not included in the list of tuples and has no description.

10. The computer-implemented method of claim 9, further comprising learning a feature vector for each of the nodes in the graph.

11. The computer-implemented method of claim 10, wherein the feature vector is learned by using message passing and the colors of the nodes as initial seeds.

12. The computer-implemented method of claim 11, further comprising generating a description of the new node by designating each of the learned feature vectors as initial states.

13. The computer-implemented method of claim 12, wherein the initial states are fed into a recurrent neural network (RNN)-based decoder in a semi-supervised fashion.

14. The computer-implemented method of claim 13, wherein the similarity threshold is a difference between colors of the nodes in terms of human perception outside a predetermined range.

15. The computer-implemented method of claim 14, wherein the color difference in terms of human perception is provided by metric Delta E.

16. The computer-implemented method of claim 15, wherein, if the Delta E between two colors is between 11 and 49, an edge is generated between the two colors.

17. The computer-implemented method of claim 16, wherein loss in the RNN is computed on a labeled portion of the graph.

18. The computer-implemented method of claim 8, wherein filtering the edges involves removing redundant or unfeasible edges from the graph.

19. The computer-implemented method of claim 8, wherein, after the new node is added to the graph, contextual information from the edges is used from a set of labeled nodes to a set of unlabeled nodes to learn a description for the new node.

20. A computer program product for generating a description in natural language for a color, the computer program product comprising a non-transitory computer readable storage medium having program instructions embodied therewith, the program instructions executable by a computer to cause the computer to:

acquire a list of tuples, each of the tuples including a color and a description;

generate a graph by using each of the tuples as a node and add edges between the nodes when a difference between colors of the nodes in terms of human perception is outside a predetermined range;

filter the edges based on external color comparative descriptions stored in an external color comparative database;

incorporate a new node in the graph by finding a closest neighbor node based on the color difference in terms of human perception and add a new edge between the new node and the closest neighbor node, the new node including a new color which is not included in the list of tuples and has no description;

learn a feature vector for each of the nodes in the graph by using message passing and the colors of the nodes as initial seeds; and generate a description of the new node by using each of the learned feature vectors as initial states for a recurrent neural network (RNN)-based decoder in a semi-supervised fashion.

21. The computer program product of claim 20, wherein, after the new node is added to the graph, contextual information from the edges is used from a set of labeled nodes to a set of unlabeled nodes to learn a description for the new node.

22. A computer program product for generating a description in natural language for a color, the computer program product comprising a non-transitory computer readable storage medium having program instructions embodied therewith, the program instructions executable by a computer to cause the computer to:

obtain a list of tuples, each of the tuples including a color and a description;

generate a graph by using each of the tuples as a node and add edges between the nodes based on a similarity threshold;

filter the edges based on external color comparative descriptions stored in an external color comparative database; and incorporate a new node in the graph by finding a closest neighbor node based on the similarity threshold and add a new edge between the new node and the closest neighbor node.

23. The computer program product of claim 22, wherein a feature vector is learned for each of the nodes in the graph, the feature vector learned by using message passing and the colors of the nodes as initial seeds.

24. The computer program product of claim 23, wherein a description of the new node is generated by designating each of the learned feature vectors as initial states fed into a recurrent neural network (RNN)-based decoder in a semi-supervised fashion.

25. A computer-implemented method for generating a description in natural language for a color, the computer-implemented method comprising:
- generating a graph to structure color relationships, the graph including a plurality of nodes and edges;
- removing redundant edges based on color comparative descriptions;
- incorporating new nodes with new edges in the graph based on a similarity threshold;
- learning a feature vector for each of the nodes of the graph; and
- generating a description of the new nodes by employing the feature vectors, the feature vectors fed into a neural network in a semi-supervised manner.

* * * * *